No. 844,167. PATENTED FEB. 12, 1907.
J. McL. MURPHY.
WATER PURIFYING APPARATUS.
APPLICATION FILED OCT. 6, 1906.
2 SHEETS—SHEET 2.
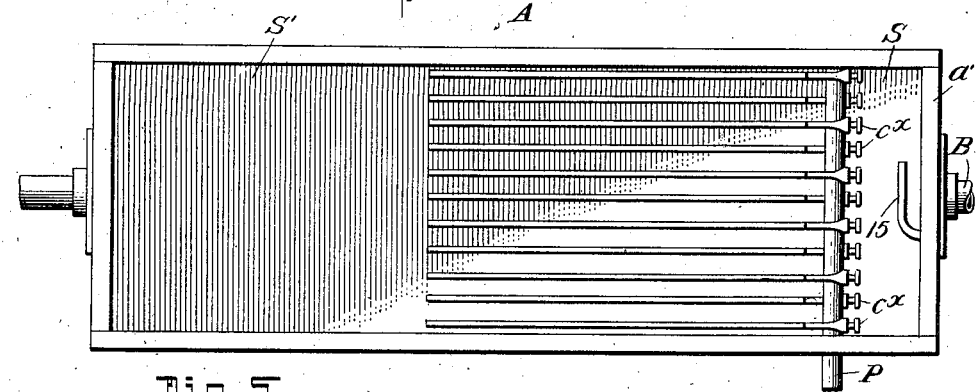
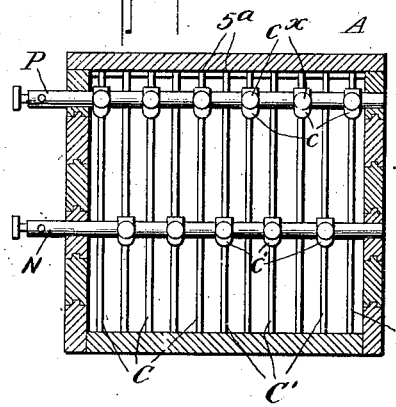
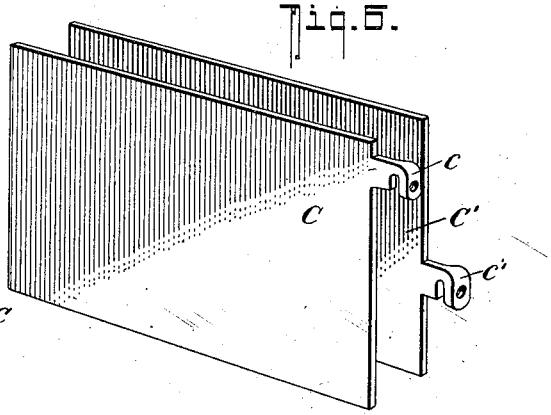
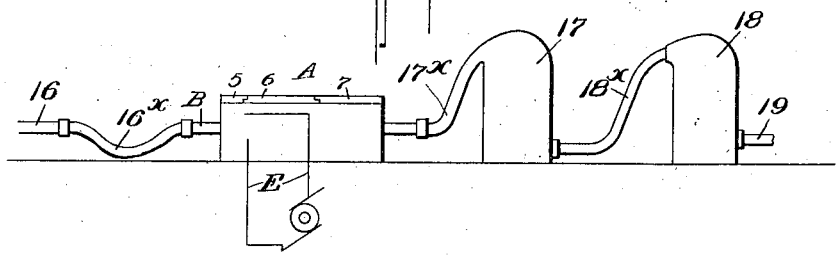
Witnesses
F. C. Gibson.
John T. Schrott.
Inventor
John McLeod Murphy.
By
Fred G. Dieterich
Attorneys

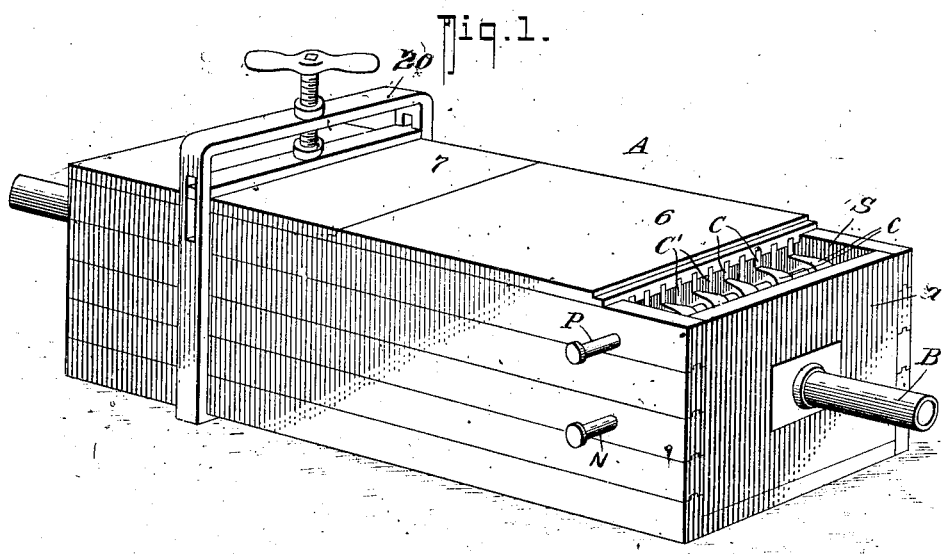
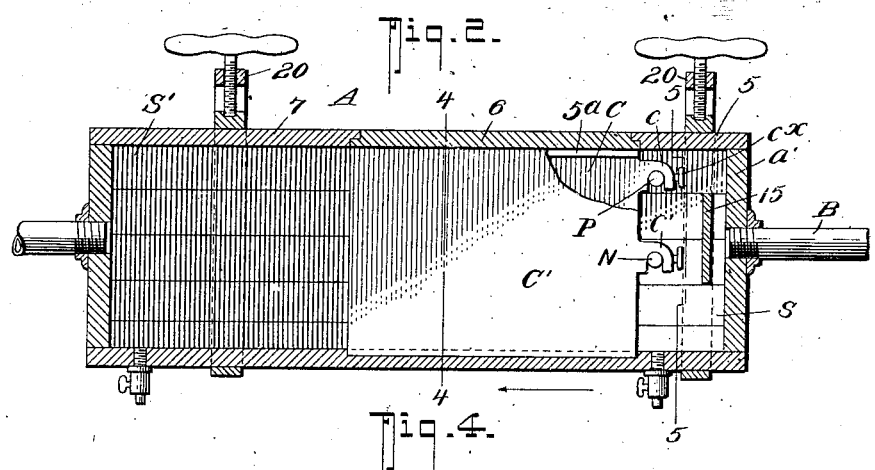
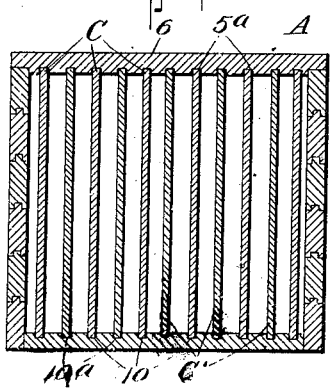

UNITED STATES PATENT OFFICE.

JOHN McLEOD MURPHY, OF DANBURY, CONNECTICUT, ASSIGNOR, BY MESNE ASSIGNMENTS, TO AMERICAN FILTRATION COMPANY, OF PHILLIPSBURG, NEW JERSEY, A CORPORATION OF NEW JERSEY.

WATER-PURIFYING APPARATUS.

No. 844,167.  Specification of Letters Patent.  Patented Feb. 12, 1907.

Application filed October 6, 1906. Serial No. 337,819.

*To all whom it may concern:*

Be it known that I, JOHN McLEOD MURPHY, residing at Danbury, in the county of Fairfield and State of Connecticut, have invented a new and Improved Water Filtering and Purifying Apparatus, of which the following is a specification.

My invention relates to apparatus for purifying water by electrical or electrolytic action, which serves to eliminate therefrom animal matter, bacteria, and other organic impurities of all kinds in order to render the water pure and wholesome for drinking and other purposes; and my said invention seeks to provide certain improvements, especially in that type of electrolytic processes in which aluminium electrodes are employed.

Numerous attempts have been made to purify water by electrolytic processes utilizing electrodes of iron, zinc, and aluminium as the anodes of the electric circuit; but, so far as I know, the results heretofore obtained by the said processes have not been all that is desired, for the reason when the anodes are of iron or zinc, oxids or oxyhydrates are formed thereby, the salts of which go into the solution of the water treated and act on the water in a manner to render the same deleterious and noxious to health.

While the aforesaid conditions are almost entirely overcome when the anodes are of aluminium, the results are still far from being satisfactory, especially when large bodies of water are to be filtered and purified, for the reason that an effective prevention of corrosion of the aluminium plates is not provided for, and thereby the use of said aluminium plates is expensive, unsatisfactory, and not to be relied upon to produce a proper purification and filtration of the water acted on.

My invention primarily seeks to provide a filtering and purifying apparatus of the character stated of an economical and effectively operating construction, in which special provision is made for preventing the corrosion of the aluminium electrodes and materially increasing the life thereof and by which the said plate corrosion can be prevented without conflicting or counteracting the purifying action of the aluminium electrodes or the desired formation of the oxyhydrate of aluminium in the menstrum or interfering with the desired healthful carbonic-acid formations produced by the intermixing of the oxygen gas evolved at the positive pole through the decomposition of the water by the electrolytical process with the carbonaceous organic matter in the water.

Again, my invention involves a new and novel correlation of parts, particularly that of the electrodes, with the positive and negative poles of the electrical circuit, whereby a much simplified arrangement of parts is produced which can be quickly assembled at a much less cost than is possible in the other systems of the kind stated and in which the cost of manufacture is also considerably lessened and the action of purification made positive and without danger of impairing the purity of the water being treated.

In its more subordinate features my invention consists of certain novel arrangement and peculiar construction of parts, all of which will hereinafter be fully explained, and particularly pointed out in the appended claims, reference being had to the accompanying drawings, in which—

Figure 1 is a perspective view of my filtering and purifying apparatus, one of the lids being removed. Fig. 2 is a longitudinal section thereof. Fig. 3 is a plan view thereof, the lids being removed. Fig. 4 is a cross-section on the line 4 4 of Fig. 2 looking in the direction of the arrow. Fig. 5 is a similar view on the line 5 5 of Fig. 2 looking in the direction of the arrow. Fig. 6 is a detail view of several of the electrode-plates detached. Fig. 7 is a diagrammatic view, hereinafter referred to.

In the practical application of my invention the filtering reservoir or tank may be made of various shapes and sizes to suit the conditions required and the special correlation of the positive and negative poles of the circuit and the plates connected therewith without departing from my invention or the scope of the claims. For ordinary purposes I prefer to construct my apparatus generally in the manner shown in the drawings, in which—

A designates a tank or box, preferably of wooden planks two and one-half inches thick and of cypress or oak.

B designates the feed-pipe, which enters the intake $a'$ of the tank and discharges into the space S at the intake end, as clearly shown in Fig. 3, and between said space S and a second space S' at the outlet end of the tank are mounted the electrode-plates C and C', which are supported in a peculiar manner within the tank, whereby to permit of the easy and quick withdrawal or insertion of one or more of the plates without disturbing the remainder, as will hereinafter be more fully described.

Between the spaces S and S' the bottom of the box A has a series of longitudinal grooves 10 $10^a$, in practice about one-fourth of an inch apart, and in these grooves fit the anode-plates C and the cathode-plates C', and the said plates are detachably supported within the grooves 10 $10^a$ and are respectively held in contact with the positive and negative poles P and N, joined with the electrical circuit E, as clearly shown in Figs. 1 and 4, by reference to which it will be noticed the said poles P and N are in the nature of metal rods that pass entirely through one side of the tank A and enter sockets in the other side thereof, and the said rods P and N are disposed in different horizontal planes, the purpose of which will presently appear.

The plates C and C' have a rectangular shape, and each plate has a projecting hook or claw-piece $c$ $c'$, the hook member $c$ of the positive plate C being disposed at the upper edge of the said plate C, and the member $c'$ is disposed at a point about centrally of the end of the member C', such relative arrangement of the members $c$ $c'$ being provided to permit of a convenient and effective connection of the several plates and their respective pole-rods P and N and for the ready removal of any one or more of the plates when desired.

As is clearly shown, the bolts or rods P and N are disposed at the receiving end of the tank, so that the pressure of the water will have a tendency to compel the plates to draw or bear down upon the rods P and N, and, if desired, the members $c$ $c'$ may be equipped with set-screws $c^2$ $c^3$ for firmly clamping them onto their respective pole-pieces N and P.

The grooves in the bottom of the tank are made deep enough to allow the plates C C' to rise and fall into position, the weight of the plates being sufficient to hold them in a proper operative position.

The electrodes C and C' are formed of a metallic body consisting of aluminium and magnesium, in about the proportion of ninety-five percentum aluminium and five per centum magnesium.

So far as described it will be readily understood the water as it passes into the tank A and is allowed to escape at the other end will be caused to pass over and between the plates C and C' and be brought into the greatest possible amount of electrode-surface, and thereby receive a thorough treatment by the electric current passing through the electrode and through the water, and the latter is thereby thoroughly saturated with oxygen gas to the limit of its solvent power and is rendered palatable and healthful.

The aluminium electrodes render the impurities insoluble, which then coagulate with the oxyhydrate of aluminum, rise to the surface by reason of their buoyancy and the pressure of the gases set free during the electrolytic treatment, and can then be readily run off or skimmed.

From practical experience in purifying apparatus utilizing aluminium electrodes I have found that the decomposition of the vegetable matter in the fluid soon corrodes the electrodes and renders them unfit for producing a perfect and rapid purification of the water. These objectionable features I find can be overcome by having a certain percentage of magnesium in the electrode-plates, which magnesium and the electrolytic plates will become oxidized to form magnesium oxid, which acts as an anti-acid and serves to neutralize any acidity of solution to an extent sufficient to prevent corrosion of the aluminium of the electrodes. To further increase the purification of the water, I provide a baffle or disk plate 15 at a point inside the discharge end of the feed-pipe, (see Figs. 3 and 5,) which serves to prevent the water entering the box A under a direct head and passing through the middle ones of the plates C and C' only and to cause the water-column to spread in every direction and deflect it in such manner as to cause the water to pass over a maximum electrode-surface as it runs from the inlet to the outlet end of the box.

5, 6, and 7 represent cover members that fit water-tight onto the top of the box when closed down, and the member 5 has grooves $5^a$ in its under side to fit over the upper edges of the plates C and C', and in practice it is usual to hold the said cover members in place by a suitable clamping device, (indicated by 20 on Figs. 1 and 2.)

From the foregoing, taken in connection with the accompanying drawings, it is believed the complete operation and the advantages of my invention will be readily apparent to those skilled in the art to which it appertains.

In Fig. 7 I have illustrated my invention as used in connection with supplemental filters 17 and 18. The one 17 may be an ordinary stone filter, while the one 18 may be a charcoal filter of the ordinary type. These filters 17 and 18 are connected to each other and to the electrical purifier A by suitable rubber pipe-sections $17^x$ $18^x$, while a rubber pipe-section $16^x$ is used to connect the purifier A to the water-main 16, the outlet-pipe being connected, as at 16, to the filter 18. The dynamo E has its terminals connected with the corresponding terminals of the electrolytic purifier, as indicated.

Having thus described my invention, what I claim, and desire to secure by Letters Patent, is—

1. An apparatus of the character described, comprising an electrolyzing-chamber having an inlet at one end and an outlet at the other end, a series of positive and negative electrodes detachably supported lengthwise in the said chamber, an electric circuit in connection therewith, and a deflector over the inlet end adapted to distribute the inflow over the ends of all the plates, as set forth.

2. An apparatus as described comprising in combination with a box having an inlet at one end and an outlet at the other end, and a negative and positive pole-piece projected transversely over the entrant end of the box; said pieces being in different horizontal planes, the bottom of the box having longitudinal grooves, of the plates C and C' adapted to seat in the said grooves, said plates each having a projecting hook member at the receiving end, the hooks on the two sets of plates being disposed in different horizontal planes whereby to interengage with the pole-pieces, substantially as shown and described.

3. The combination with the box, the separate lids therefor, the central lid having longitudinal grooves, the bottom of the box having longitudinal grooves to coact with the lid-grooves, the box having an inlet at one end and an outlet at the other end, the pole-pieces extended across the entrant end of the box, said pieces being in different horizontal planes, of the plates C C' adapted to detachably seat in the upper and lower grooves of the box, said plates each having a projecting lug at the receiving end, the lugs on the two sets of plates being disposed in different horizontal planes to interlock with the respective pole-pieces, and means for electrically energizing the pole-pieces, as set forth.

JOHN McLEOD MURPHY.

Witnesses:
MAX C. GADEIS,
W. B. SHAFFER.